United States Patent
Sung et al.

(10) Patent No.: US 7,873,858 B2
(45) Date of Patent: Jan. 18, 2011

(54) CLOCK SIGNAL GENERATION DEVICE AND METHOD

(75) Inventors: Hyuk-Jun Sung, Yongin-si (KR); Chan-Yong Kim, Yongin-si (KR); Jong-Pil Cho, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 821 days.

(21) Appl. No.: 11/775,541

(22) Filed: Jul. 10, 2007

(65) Prior Publication Data

US 2008/0079465 A1 Apr. 3, 2008

(30) Foreign Application Priority Data

Sep. 26, 2006 (KR) .................. 10-2006-0093634

(51) Int. Cl.
*G06F 1/04* (2006.01)
(52) U.S. Cl. .................. 713/500; 713/501; 713/502; 713/503
(58) Field of Classification Search .......... 713/500, 713/501, 502, 503
See application file for complete search history.

(56) References Cited

U.S. PATENT DOCUMENTS

| | | | |
|---|---|---|---|
| 6,343,364 B1 * | 1/2002 | Leydier et al. | 713/500 |
| 6,762,635 B2 * | 7/2004 | Bruhnke et al. | 327/160 |
| 6,771,726 B2 * | 8/2004 | Pomet | 375/362 |
| 7,154,343 B2 * | 12/2006 | Okuda | 331/16 |
| 7,283,000 B2 * | 10/2007 | Yang et al. | 331/1 A |
| 7,446,615 B2 * | 11/2008 | Okuda | 331/16 |
| 7,453,958 B2 * | 11/2008 | Greco et al. | 375/326 |
| 2004/0148539 A1 * | 7/2004 | Leydier et al. | 713/500 |
| 2008/0150645 A1 * | 6/2008 | McCorquodale et al. | 331/117 R |

FOREIGN PATENT DOCUMENTS

| | | |
|---|---|---|
| JP | 2003-078512 | 3/2003 |
| KR | 1020020057697 | 7/2002 |
| KR | 1020030038706 | 5/2003 |
| KR | 1020030065600 | 8/2003 |
| KR | 1020040017184 | 2/2004 |
| KR | 1020040093854 | 11/2004 |
| KR | 1020050096030 | 10/2005 |
| KR | 1020060055311 | 5/2006 |

* cited by examiner

*Primary Examiner*—Nitin C Patel
(74) *Attorney, Agent, or Firm*—F. Chau & Associates, LLC

(57) ABSTRACT

A clock signal generator for a USB device. The clock signal generator includes a control circuit and a clock generator that does not need to include a crystal oscillator. The control circuit counts the cycle of the clock signal during the period between two sync signals successively inputted, and generates a frequency control signal corresponding to the count value. The clock generator generates the clock signal with a frequency corresponding to the frequency control signal. The clock signal generator can generate a clock signal that is suitable for the data transfer rate defined, in the USB specification. In addition, the clock; signal generator can generate an RX clock signal so that an RX data signal can be recovered with its energy being stable.

41 Claims, 14 Drawing Sheets

Fig. 12

| RCNT | RATE[2:0] | FREQUENCY DIVISION RATIO |
|---|---|---|
| 38000 ~ 40000 | 000 | 1,4,3,3,3,3,4 |
| 40000 ~ 42000 | 001 | 1,4,3,4,3,3,4 |
| 42000 ~ 45000 | 010 | 1,4,3,4,4,3,4 |
| 45000 ~ 47000 | 011 | 1,4,4,4,4,3,4 |
| 47000 ~ 51000 | 100 | 1,4,5,4,4,4,4 |

CLOCK SIGNAL GENERATION DEVICE AND METHOD

CROSS-REFERENCE TO RELATED APPLICATIONS

This U.S. non-provisional patent application claims priority, under 35 U.S.C. 119, of Korean Patent Application No. 10-2006-93634, filed on Sep. 26, 2006, the entire contents of which are incorporated by reference herein.

BACKGROUND OF THE INVENTION

1. Field of the Invention

The present invention relates to a clock signal generator, and more particularly, to a clock signal generator for a Universal Serial Bus (USB) device.

2. Description of the Related Art

The USB interface was developed to standardize an interface for connecting a computer and peripheral devices such as a mouse, a printer, a modem, scanner, and speakers, etc. The USB interface is a kind of serial port that was developed by the consortium of PC manufactures such as Intel, Compaq, Microsoft, Philips, IBM, and NEC, which attracted public attention with the launch of Windows 98. This disclosure incorporates by reference the contents of the USB Specification Revision 2.0 dated Apr. 27, 2000.

Because the use of the USB interface can avoid the costly installation of complex adapters, most standard PC devices are equipped with USB ports. Currently, the USB interface is widely used to transfer data from mobile phones or digital cameras to personal computers (PCs). A first generation (USART) serial port can only support a data transfer rate of at most 100 Kbps. On the other hand, a full-speed USB port can support a data transfer rate of up to 12 Mops. In addition, the full-speed USB can be connected to up to 127 devices in a hub or chain configuration. Furthermore, a full-speed USB device can be connected (hot swapped) and recognized even during the use of a PC. Moreover, many full-speed USB peripheral devices requires no external power.

A smart card is a plastic, card having the same size as a credit card, and includes an integrated circuit (IC) chip that includes a microprocessor, a card operating system (software), a security module, and a memory (RAM, ROM, EEPROM, Flash, etc.) and thus can perform a specific transaction. A typical smart card includes a plastic card having the same size and thickness as a credit card and a 0.5 mm thick semiconductor chip installed within the plastic card in a chip-on-board (COB) configuration.

Smart cards have rapidly emerged as the next-generation multimedia information medium because it has a higher stability than a magnetic-stripe card, has no possibility of data being erased, and has higher security.

The recent increase in application for smart card, has increased the need for rapid communication between a computer system and a smart card. For example, for user authentication of a computer system using a smart card, information in the smart card must be transferred to the computer system. Conventional smart card readers are relatively expensive, relatively slow serial devices. What is therefore desired is communication between a smart card and a computer system using a USB interface. However, a smart card's thin dimension does not allow for the inclusion of a crystal oscillator typically employed in the USB port of a peripheral device.

The USB specification requires that a data transfer rate be maintained to a predetermined accuracy. For example, an accuracy of ±0.25% is required in a full-speed mode (12 Mbps) of USB 1.1. This accuracy can be achieved through clock accuracy. Because a USB bus includes no clock line, each device must be able to internally generate a clock signal itself. If a device cannot generate an accurate clock signal, the device is not USB-compatible.

In general, an RC oscillator has an accuracy of ±10% and is insufficient. A clock signal generated by a more accurate oscillator circuit typically has an accuracy of ±3%. To enhance the accuracy of an oscillator circuit, a crystal is connected to a semiconductor chip. However, in this case, the semiconductor chip must have at least two additional pins for connecting the crystal to the outside of the semiconductor chip, which causes additional costs. Furthermore, the crystal is relatively large and thus cannot be used in chip cards such as smart cards and memory cards.

SUMMARY OF THE INVENTION

An aspect of the present invention provides a clock signal generator for a USB device.

Another aspect of the present invention provides a clock signal generator that can generate a high-accuracy clock signal even without using a crystal oscillator.

Another aspect of the present invention also provides a clock signal generator that can generate an RX clock signal for accurately recovering data received via a USB bus and also can generate a TX clock signal suitable for USB data transfer.

Exemplary embodiments of the present invention provide clock signal generators that include: a control circuit counting in synchronization with a clock signal during the period between two sync signals successively inputted, and generating a frequency control signal corresponding to the count value, and a clock generator generating the clock signal with a frequency corresponding to the frequency control signal.

In some exemplary embodiments, the control circuit locks the frequency control signal while the count value is within a predetermined range.

In other exemplary embodiments, the clock generator includes: a current controller generating a current corresponding to the frequency control signal; and an oscillator generating the clock signal with a frequency corresponding to the current.

In further exemplary embodiments, the current controller includes: a voltage generator generating a control voltage; a plurality of transistors corresponding respectively to the bits of the frequency control signal and controlled by the control voltage, each of the transistors having a first terminal connected to a power voltage; and a plurality of switches corresponding respectively to the transistors and controlled respectively by the corresponding bits of the frequency control signal, each of the switches having a first terminal connected to a second terminal of the corresponding transistor and a second terminal connected to a first node. Each of the plurality of transistors has a different channel width, and thus a different resistance when turned ON. Thus, the amounts of currents flowing through the respective transistors to the first node are different from each other. The oscillator generates the clock signal with a frequency corresponding to the amount of the current flowing to the first node.

In still further exemplary embodiments, the control circuit includes: a control signal generator generating a first enable pulse signal in synchronization with the two sync signals successively inputted and generating a second enable pulse signal in synchronization with the first enable pulse signal; and a TX clock controller starting to count in response to the first enable pulse signal and generating the frequency control signal corresponding to the count value in response to the second enable pulse signal. The TX clock controller activates a frequency lock signal when the count value is within a predetermined range. The control signal generator stops the generation of the second enable pulse signal when the frequency lock signal is activated.

In various exemplary embodiments, the frequency control signal is an N-bit signal (N: a positive integer), and the TX clock controller successively changes the bits of the frequency control signal when the count value is not within the predetermined range. The TX clock controller locks the frequency control signal when the count value is within the predetermined range.

In various exemplary embodiments, the TX clock controller receives an error range signal for defining the predetermined range.

In various exemplary embodiments, the two sync signals are start-of-frame (SOF) signals according to the USB specification.

In various exemplary embodiments, the control signal generator controls the oscillator to be disabled during a suspend mode defined in the USB specification.

In other exemplary embodiments of the present invention, clock signal generators include: a control signal generator generating first and second TX enable pulses and a first RX enable pulse in synchronization with two sync signals successively inputted; a TX clock controller starting to count a TX clock signal in response to the first TX enable pulse and generating a TX frequency control signal corresponding to the first count value in response to the second TX enable pulse; a TX clock generator generating the TX clock signal with a frequency corresponding to the TX frequency control signal; an RX clock controller generating an RX frequency control signal in response to the first RX enable pulse; and an RX clock generator generating a first RX clock signal with a frequency corresponding to the RX frequency control signal.

In some exemplary embodiments, the clock signal generators further include an RX clock recoverer starting to count the first RX clock signal in synchronization with transition of an input data signal and generating a second RX clock signal when the count value reaches predetermined values.

In other exemplary embodiments, the control signal generator generates the first TX enable pulse in synchronization with the two sync signals successively inputted, generates the second RX enable pulse in synchronization with the first TX enable pulse, generates a second RX enable pulse in synchronization with the two sync signals successively inputted, and generates the first RX enable pulse in synchronization with the second RX enable pulse.

In further exemplary embodiments, the RX clock controller starts to count the first RX clock signal in response to the second RX enable pulse and provides the RX clock recoverer with the predetermined values corresponding to the second count value.

In still further exemplary embodiments, the RX clock controller starts to count the first RX clock signal in response to the second RX enable pulse and generates the RX frequency control signal corresponding to the second count value in response to the first RX enable pulse.

In still further exemplary embodiments, the RX clock generator includes: a current controller generating a control current corresponding to the RX frequency control signal; and an oscillator generating the RX clock signal with a frequency corresponding to the control current.

In various exemplary embodiments, the RX frequency control signal includes a plurality of bits.

In various exemplary embodiments, the current controller includes: a voltage generator generating a control voltage; a plurality of switches corresponding respectively to the bits of the RX frequency control signal and controlled respectively by the corresponding bits of the RX frequency control signal, each of the switches having a first terminal connected to a first node; and a plurality of resistors (e.g., transistors controlled by the control voltage), each of the resistors having a first terminal connected to a power voltage and a second terminal connected to a second terminal of the corresponding switch. The amounts of currents flowing through the respective resistors to the first node are different from each other.

In further exemplary embodiments of the present invention, clock signal generation methods include: generating a clock signal; receiving two sync signals successively and counting the clock signal during the period between the two sync signals; and changing the frequency of the clock signal according to the count value if the count value is not within a predetermined range.

The changing of the frequency of the clock signal includes locking the frequency of the clock signal when the count value is within a predetermined range.

The changing of the frequency of the clock signal includes: generating a frequency control signal corresponding to the count value; and changing the frequency of the clock signal according to the frequency control signal.

The frequency control signal includes a plurality of bits, and the generating of the frequency control signal includes: determining whether the count value is within a predetermined range; and changing the values of the bits of the frequency control signal when the count value is not within a predetermined range.

The generating of the frequency control signal may further includes locking the values of the bits of the frequency control signal when the count value is within the predetermined range.

The frequency control signal includes N bits (N: a positive integer), and the generating of the frequency control signal includes: selecting one among the N bits; setting the selected bit to a first value; determining whether the count value is within a predetermined range; and resetting the selected bit to a second value when the count value is not within a predetermined range.

The generating of the frequency control signal further includes: selecting one among the unselected bits of the N bits when the count value is not within the predetermined range; and returning to the determining step.

The generating of the frequency control signal further includes: setting the previously-selected bit of the N bits to a currently-selected bit when the count value is within the predetermined range; and activating a frequency lock signal.

The frequency lock signal is initially in an inactive state, and the generating of the frequency control signal is performed while the frequency lock signal is in an inactive state.

In still further exemplary embodiments of the present invention, clock, signal generation methods include: a) generating a first clock with a maximum frequency (e.g., a maximum determined by hardware or software); b) generating a second clock with a minimum frequency (e.g., a minimum determined by hardware or software); c) receiving two sync signals successively and counting the first clock and the second clock during the period between the two sync signals; and d) changing the frequency of the first, clock according to the count value of the first clock and the count value of the second clock.

The changing of the frequency of the first clock may include changing the frequency of the first clock according to a difference between the count value of the first clock and the count value of the second clock.

The clock signal generation methods may further include counting the first clock with the changed frequency, wherein the steps a) through d) are repeatedly performed when the count value of the first clock is not within a predetermined range.

In still further exemplary embodiments of the present invention, IC cards include: a transceiver transferring/receiving data through a data terminal in synchronization with a TX/RX clock according to the USB specification, detecting a sync signal received through the data terminal, and outputting the detection signal upon detecting each sync signal received; and a clock signal generator counting the TX clock during the period between two detection signals outputted from the transceiver, and generating the TX clock with a frequency corresponding to the count value.

The clock signal generator may include: a TX clock control circuit counting the TX clock during the period between the two detection signals, and generating a TX frequency control signal corresponding to the count value; and a TX clock generator generating the TX clock with a frequency corresponding to the TX frequency control signal.

The TX clock control circuit may lock the TX frequency control signal when (while) the count value is within a predetermined range.

The clock signal generator may include: an RX clock control circuit counting the RX clock during the period between the two detection signals, and generating an RX frequency control signal corresponding to the count value; and an RX clock generator generating the RX clock with a frequency corresponding to the RX frequency control signal.

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures:

FIG. 12 is a table illustrating a selection signal outputted from an RX clock control circuit according to the count value of the counter and a frequency division ratio corresponding to the selection signal.

DETAILED DESCRIPTION OF PREFERRED EMBODIMENTS OF THE INVENTION

Figure 1:
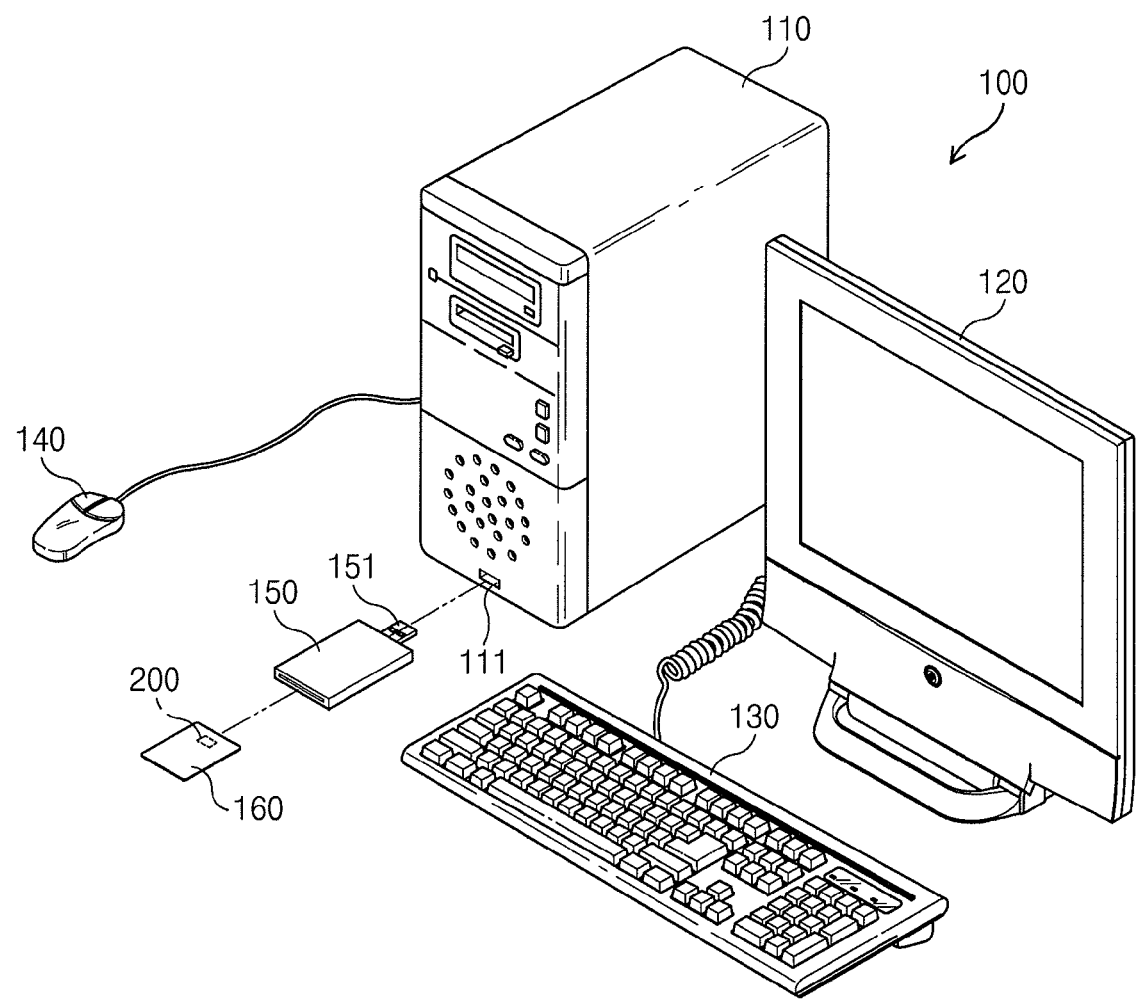
FIG. 1 illustrates a smart card connected through a USB interface to a computer system, according to an embodiment of the present invention.

FIG. 1 illustrates a smart card connected through a USB interface to a computer system, according to an exemplary embodiment of the present invention.

Referring to FIG. 1, a computer system 110 includes a computer main body 110, a monitor 120, a keyboard 130, and a mouse 140. The computer system 110 can communicate with a smart card 160 through a dongle 150 according to the protocol defined in the USB specification.

The dongle 150 is a kind of adapter that has a plug 151 connectable to a USB port 111 of the computer main body 110 and into which the smart card 160 can be inserted, and functions as an external card reader. The dongle 150 may comprise or consist essentially of passive components (e.g., conductors) such as conductive wires and ohmic terminals. When the smart card 160 is inserted into the dongle 150, terminals of an SC chip 200 in the smart card 160 are electrically connected through the plug 151 to the USB port 111 of the computer main body 110.

When the plug 151 of the dongle 150 is inserted into the USB port 111 of the computer main body 110, the computer main body 110 automatically recognizes the smart card 160 according to a Plug-and-Play (PnP) process. The USB port 111 of the computer main body 110 outputs sync signals to the IC chip 200 via the data terminals 203 and 204, and outputs data signal D+ and D− also via the data terminals 203 and 204, as an RX data signal R_DATA.

Figure 2:
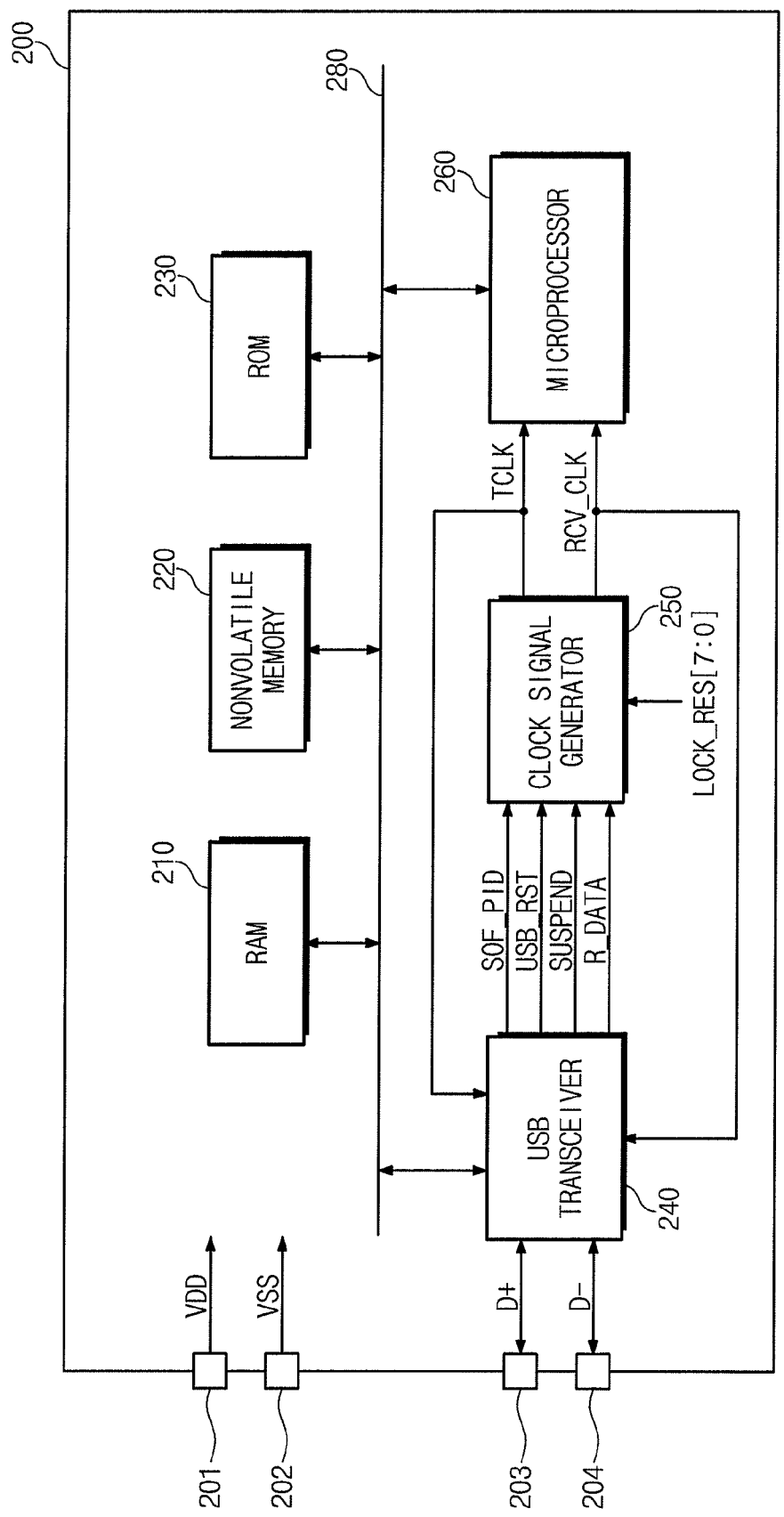
FIG. 2 is a block diagram of a smart card chip that is an IC chip of the smart card, according to an embodiment of the present invention.

FIG. 2 is a block; diagram of a smart card chip 200, i.e., an IC chip of the smart card 160 of FIG. 1, according to an exemplary embodiment of the present invention.

Referring to FIG. 2, the smart card chip 160 having a USB port includes a random access memory (RAM) 210, a non-volatile memory 220, a read only memory (ROM) 230, a USB transceiver 240, a clock signal generator 250, and a microprocessor 260. The smart card chip 160 further includes power voltage terminals 201 and 202 and USB D+ and D− data terminals 203 and 204 for communication according to the USB protocol. The data terminals 203 and 204 are connected to the USB transceiver 240. The smart card chip 200 may further include terminals for performing other communication modes and other interfaces such as an International Standardization Organization (ISO) interface suitable for ISO 7816 communication.

The USB transceiver 240 generates control signals SOF_PID, USB_RST and SUSPEND based upon the sync signals received from the host (e.g. PC) through the data terminals 203 and 204, and outputs data signal D+ and D−, which are received from the host through the data terminals 203 and 204, as an RX data signal R_DATA. The clock signal generator 250 generates a TX clock TCLK and an RX recovery clock RCV_CLK based upon the control signals SOF_PID, USB_RST and SUSPEND received from the USB transceiver 240. The TX clock TCLK and the RX recovery clock RCV_CLK are also provided to the USB transceiver 240 and are used for data communication with the host.

According to the USB specification, a clock signal is not transmitted between a host and a USB device. Therefore, as described above, each USB device (e.g., computer peripheral device) needs a very accurate internal clock signal generator. For synchronization of data traffic between a host and a USB device, the host transfers a start-of-packet (SOF) packet, i.e., a sync signal, every 1 ms in a full-speed mode. The accuracy of the sync signal is 0.05% in the full-speed mode.

Figure 3A:
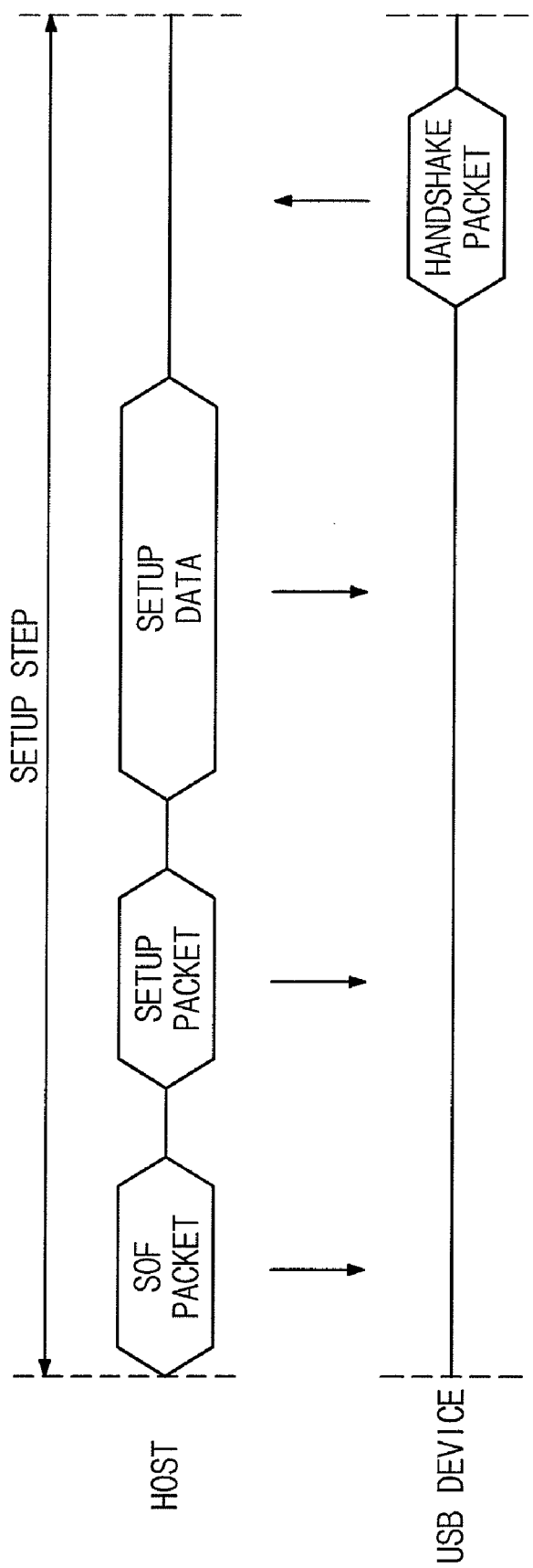
FIG. 3A is a timing diagram illustrating control signal transfer between a USB device and a host and when the USB device is connected to the host.

FIG. 3A is a timing diagram illustrating control signal transfer between a USB device and a host and when the USB device is connected to the host.

Referring to FIG. 3A, the host transfers an SOF packet, a setup packet (i.e., a packet identifier (PID) packet), and setup data to the USB device, and upon receipt of these signals, the USB device transmits a handshake packet (i.e., a response signal) to the host.

Figure 3B:
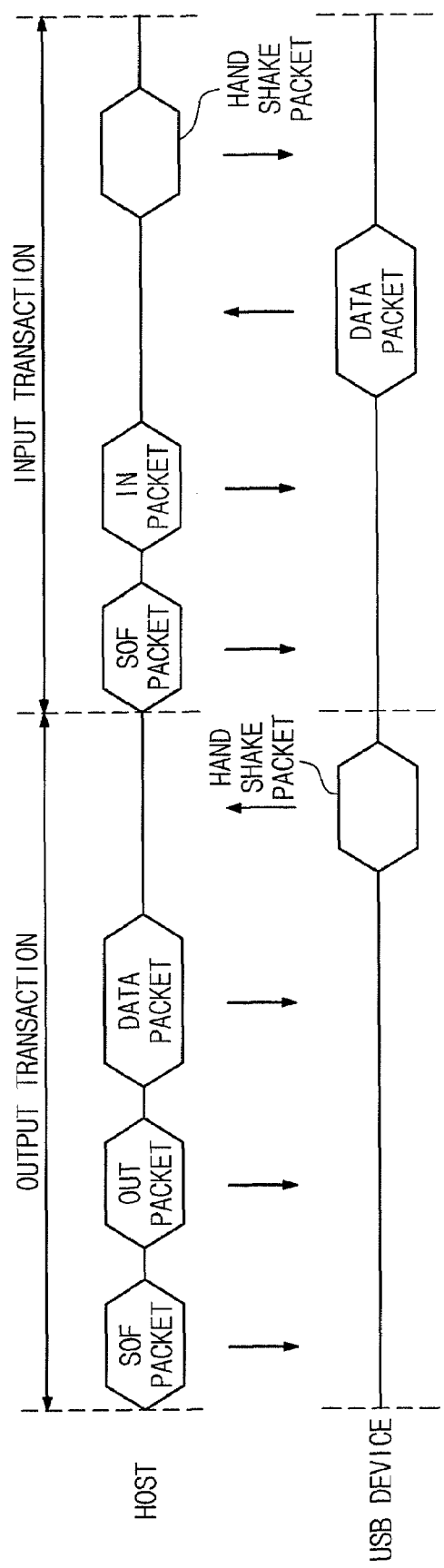
FIG. 3B is a liming diagram illustrating TX/RX packets communicated between a host and a USB device in a data TX/RX mode.

FIG. 3B is a timing diagram illustrating TX/RX packets communicated between a host and a USB device in a data TX/RX mode.

Referring to FIG. 3B, in an output transaction for data transfer from the host to the USB device, the host transfers an SOF packet, an output packet (i.e., a PID packet), and a data packet to the USB device and the USB device transfers a handshake packet to the host. In an input transaction for data transfer from the USB device to the host, the host transfers an SOF packet and an input packet (i.e., a PID packet) to the USB device and, after reception of a data packet from the USB device, the host transfers a handshake packet to the USB device.

As can be seen from the above, for data communication between a host and a USB device, an SOF packet (i.e., a sync signal) is always first transferred from the host to the USB device at periods of 1 ms. In an embodiment of the present invention, the smart card chip generates the TX clock and the RX recovery clock using the SOF packet received from the host every 1 ms.

Figure 4:
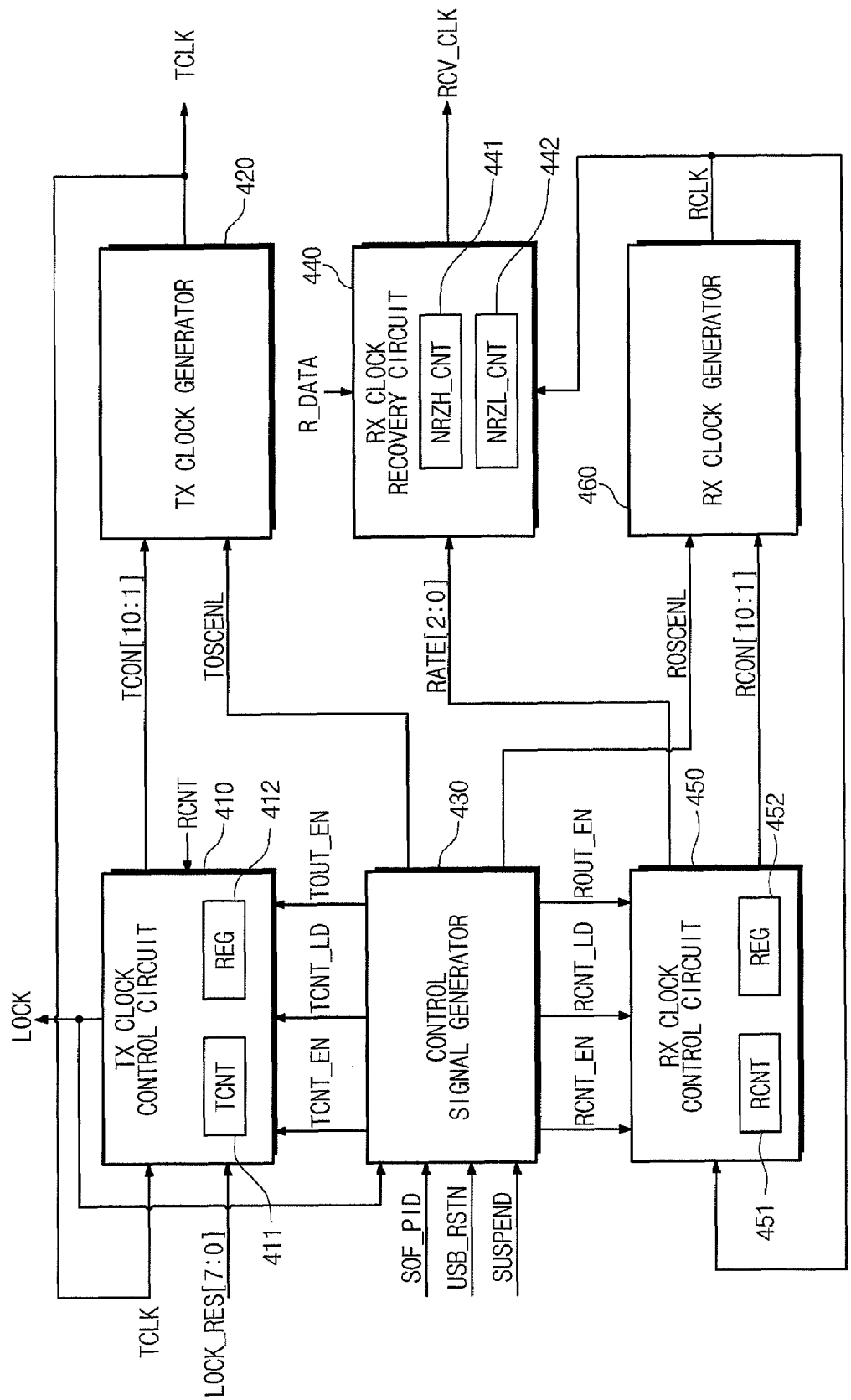
FIG. 4 is a block; diagram of a clock signal generator shown in FIG. 2, according to an embodiment of the present invention.

FIG. 4 is a block diagram of the clock signal generator 250 shown in FIG. 2, according to an embodiment of the present invention.

Referring to FIG. 4, the clock signal generator 250 includes a TX clock control circuit 410, a TX clock generator 420, a control signal generator 430, an RX clock recover circuit 440, an RX clock control circuit 450, and an RX clock generator 460. The TX clock control circuit 410 includes a counter 411 and a register 412. The RX clock control circuit 450 includes a counter 451 and a register 452.

Figure 6:
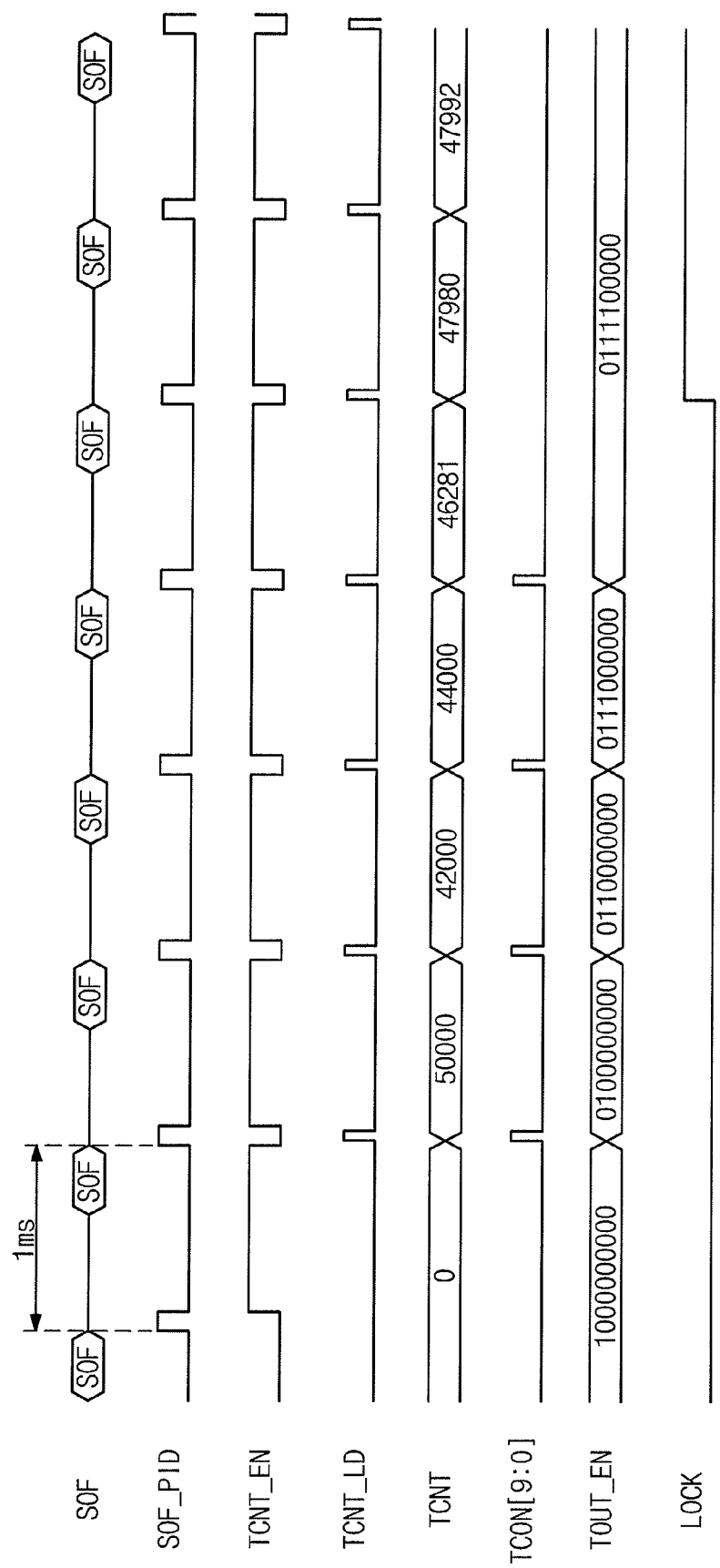
FIG. 6 is a timing diagram of signals necessary for generating a TX clock used in the clock signal generator shown in FIG. 4.

FIG. 6 is a timing diagram of signals necessary for generating the TX clock TCLK used in the clock signal generator 250 shown in FIG. 4.

A method for generating the TX clock TCLK by using the clock signal generator 250 will now be described with reference to FIGS. 4 and 6.

Referring to FIGS. 4 and 6, the control signal generator 430 generates enable signals TCNT_EN, TCNT_LD and TOUT_EN for the TX clock control circuit 410 and enable signals RCNT_EN, RCNT_LD and ROUT_EN for the RX clock control circuit 450 in response to the control signals SOF_PID, USB_RSTN and SUSPEND received from the USB transceiver 240 shown in FIG. 2.

The control signal SOF_PID is a pulse signal indicating an SOF packet and is a sync signal. In a normal state, the period of the control signal SOF_PID is 1 ms. The control signals USB_RSTN and SUSPEND are activated when an interval between two successive SOF packets, i.e., the period of an SOF packet, is not 1 ms. The control signal generator 430 operates in response to the control signal SOF_PID while the control signals USB_RSTN and SUSPEND are both in an inactive state. The counter enable signal TCNT_EN is complementary to the control signal SOF_PID and is activated to a high level while the control signal SOF_PID is in a low-level state. The count load signal TCNT_LD is a pulse signal that includes a pulse whenever the counter enable signal TCNT_EN transitions from active state to inactive state. The output enable signal TOUT_EN is used to store a ten bit wide TX clock control signal TCON[10:1], which is generated by the TX clock control circuit 410, in the register 412.

The counter 411 of the TX clock control circuit 410 counts in synchronization with the TX clock TCLK while the clock enable signal TCLK_EN is in an active state. In response to the count load signal TCNT_LD, the TX clock control circuit 410 generates the ten bit wide TX clock control signal TCON[10:1] corresponding to a count value TCNT stored in the counter 411. In response to the output enable signal TOUT_EN, the TX clock control circuit 410 stores the TX clock, control signal TCON[10:1] in the register 412. The counter 411 may be designed to be cleared in response to the count load signal TCNT_LD.

Figure 5:
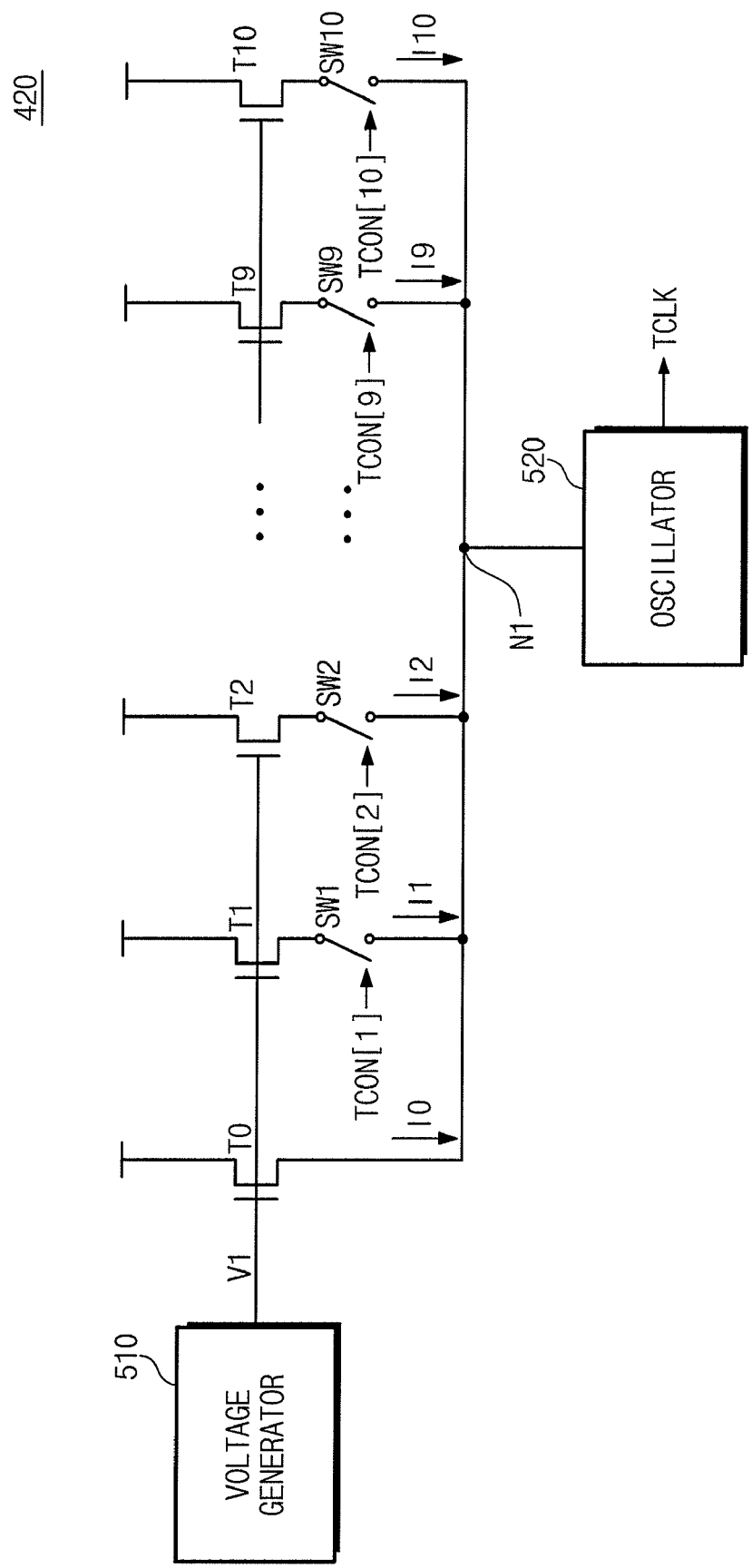
FIG. 5 is a circuit diagram illustrating an example of a TX clock generator shown in FIG. 4.

FIG. 5 is a circuit diagram illustrating an example of the TX clock generator 420 shown in FIG. 4.

Referring to FIG. 5, the TX clock generator 420 includes a voltage generator 510, ten MOS (FET) transistors T0 to T10, ten switches SW1 to SW10, and an oscillator 520. The voltage generator 510 generates a voltage V1 high enough to turn on the MOS transistors T1 to T10. Each of the ten MOS transistors T0 to T10 has a drain connected to a common power voltage and a gate connected to the voltage V1 from the voltage generator 510. The source of the MOS transistor T0 is connected to a node N1, and the sources of the MOS transistors T0 to T10 are connected respectively to the first terminals of the corresponding switches SW1 to SW10. The second terminals of the switches SW1 to SW10 are connected to the node N1 and are controlled respectively by the corresponding TX clock control signals TCON[10:1].

In this embodiment, the amounts of currents I1 to I10 flowing through the respective NMOS transistors T1 to T10 and through the respective switches SW1 to SW10 to the node N1 are 1:2:4:8, ..., 256:512, which is possible by adjusting the sizes of the channels of the NMOS transistors T1 to T10.

For example, when the switch SW9 is turned ON and the remaining switches SW1 to SW8 are turned OFF, the current flowing to the node N1 is I0+I9=I0+I1×512. As another example, when the switches SW2 and SW8 are turned ON and the remaining switches SW1, SW3 to SW7, and SW9 are turned OFF, the current flowing to the node N1 is I0+I2+I8+I0+I1×2+I1×256=I0+I1×258.

The oscillator 520 generates the TX clock TCLK, wherein the frequency of the TX clock TCLK depends upon the current flowing to the node N1. In this embodiment, the oscillator 520 may be an RC oscillator including a resistor and a capacitor.

The amount of the current flowing to the node N1 in the TX clock generator 420 changes based upon the TX clock control signal TCON[10:1] and the frequency of the TX clock TCLK changes accordingly.

Referring again to FIGS. 4 and 6, when the desired frequency of the TX clock TCLK is 4.8 MHz±0.25%, the number of pulses of the TX clock TCLK is 4800±0.25% (i.e., 47880 to 48120) for 1 ms. When the initial value of the TX clock control signal TCON[10:1] stored in the register 412 of the TX clock control circuit 410 is '1000000000' and the count value TCNT of the counter 411 is 5000, the TX clock control circuit 410 changes the TX clock control signal TCON[10:1] into '0100000000'. The TX clock generator 420 changes the frequency of the TX clock TCLK according to the changed TX clock control signal TCON[10:1]. In this case, when the count value TCNT of the counter 411 is 42000, the TX clock control signal stored in the register 412 changes into '0100000000'. While changing the TX clock control signals TCON[10:1] successively, when the count value TCNT of the counter 411 is within a predetermined range (i.e., 47880 to 48120), the TX clock control circuit 410 activates a frequency lock signal LOCK to, for example, a high level in order to stop the changing of the TX clock control signal TCON[10:1]. The predetermined range of the count value TCNT is determined by an external resolution signal LOCK_RES[7:0]. In this embodiment, because the count value TCNT corresponding to 48 MHz is 48000 and the required error range is ±0.25%, the allowable error range of the count value TCNT is ±120.

When the frequency lock signal LOCK is activated, the control signal generator 430 maintains the output enable signal TOUT_EN at a low level. Even when the output enable signal TOUT_EN is in a low-level state, the TX clock control circuit 410 monitors the frequency of the TX clock TCLK, which is generated by the TX clock generator 420, in response to the counter enable signal TCNT_EN and the count load signal TCNT_LD. If the count value TCNT of the counter 411 is not within the predetermined range (i.e., 47880 to 481200, the frequency lock signal LOCK is deactivated to a low level so that the frequency of the TX clock TCLK can be adjusted.

Hereinafter, an exemplary operation of the clock signal generator 250 will be described in detail with reference to FIGS. 4 through 8.

Figure 7:
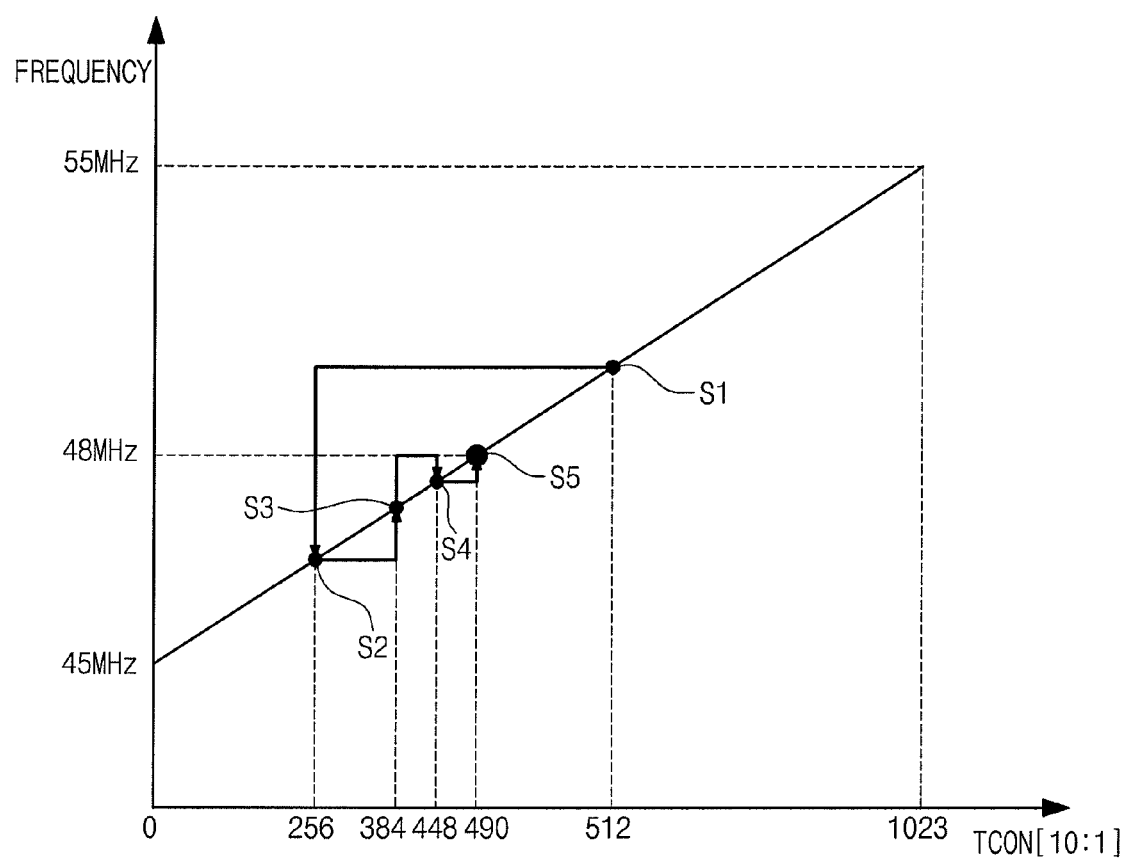
FIG. 7 is a graph illustrating an exemplary method for setting a frequency control signal, for generating a TX clock compliant with the USB specification, performed by the clock signal generator shown in FIG. 4.
Figure 8:
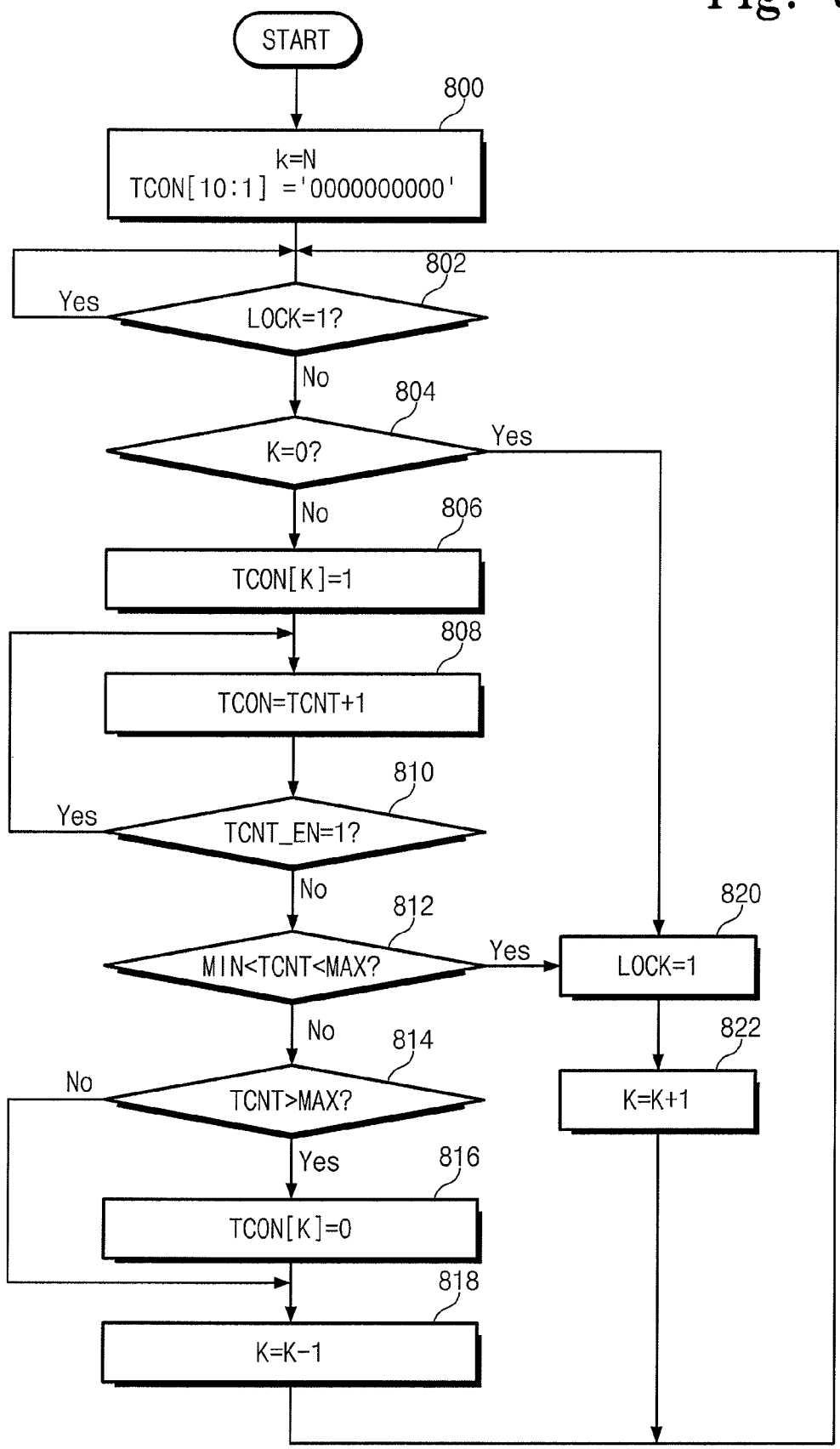
FIG. 8 is a flowchart illustrating a procedure for generating the TX clock compliant with the USB specification performed by the clock signal generator shown in FIG. 4.

FIG. 7 is a graph illustrating an exemplary method for setting a frequency control signal TCON[10:1] for generating the TX clock TCLK compliant with the USB specification by the clock signal generator 250 shown in FIG. 4. FIG. 8 is a flowchart illustrating a procedure for generating the TX clock TCLK compliant with the USB specification by the clock signal generator 250 shown in FIG. 4.

For example, when the frequency range of the TX clock TCLK generated by the oscillator 520 according to the ON/OFF condition of the switches SW1 to SW10 in the TX clock generator 420 is 43 MHz to 53 MHz as illustrated in FIG. 7, it is necessary to search for the frequency control signal TCON[10:1] to cause the frequency of the TX clock TCLK to be 48 MHz±0.25%.

In order to set the frequency control signal TCON[10:1] for generating the TX clock TCLK compliant with the USB specification, the TX clock control circuit 410 uses a successive approximation (SAR) scheme that approaches, bit by bit, from the most significant bit (MSB) to the least significant bit (LSB).

As illustrated in FIG. 8, the TX clock control circuit 410 sets a search bit k to the MSB "N" in order to determine the values of the respective bits of the frequency control signal TCON[10:1], and the initial value of the frequency control signal TCON[10:1] is '0000000000' (step 800). In this embodiment, the MSB "N" is bit 10.

Because the frequency control signal LOCK is not logically '1' (i.e., a high level) (step 802) and the search bit k is not '0' (step 804), the value of the $k^{th}$ frequency control signal TCON[k] is set to '1'. Thus, the frequency control signal TCON[10] is '1'. When the frequency control signal TCON[10:1] is '1000000000', the current flowing to the node N1 of FIG. 5 is I0+I1×512.

While the counter enable signal TCNT_EN is logically '1' (i.e., a high level) (step 810), the counter 411 counts in synchronization with the TX clock TCLK. When the counter enable signal TCNT_EN changes into a low level (step 810), it is determined whether the count value TCNT is greater than the minimum value MIN and smaller than the maximum value MAX (step 812). When the period of the counter enable signal TCNT_EN is 1 ms and the desired frequency of the TX clock TCLK is 48 MHz±0.25%, the minimum value MIN is 47880 and the maximum value MAX is 48120.

If the count value TCNT of the counter 411 is greater than the maximum value MAX, the $k^{th}$ frequency control signal TCON[k] is set to '0' (step 816). If the count value TCNT of the counter 411 is not greater than the maximum value MAX, the $k^{th}$ frequency control signal TCON[k] is maintained at '1' (step 816). Because the determination of the bit value of the $k^{th}$ frequency control signal TCON[k] is completed, the value "k" is decreased by 1 for determination (successive approximation) of the value of the next bit (step 818) and the procedure returns to step 802.

A coordinate S1 illustrated in FIG. 7 denotes the frequency of the TX clock TCLK that is generated by the oscillator 520 when the frequency control signal TCON[10:1] is '1000000000'=512. In this case, because the frequency of the TX clock TCLK is higher than 48 MHz, the value of the frequency control signal [10:1] needs to be reduced. The reason for this is that the oscillator 520 generates the Tx clock TCLK with a frequency proportional to the amount of the current flowing to the node N1. Because the frequency of the TX clock TCLK generated when the value of the frequency control signal TCON[10:1] is 512 is higher than the desired frequency 48 MHz, it can be seen that the value of the frequency control signal TCON[10:1] is smaller than 512. In this embodiment, when the count value TCNT of the counter 411 is greater than the maximum value MAX, the TX clock control circuit 410 changes the $k^{th}$ frequency control signal TCON[k] into '0', sets the $(k-1)^{th}$ frequency control signal TCON[k-1] to '1', and the above-described steps repeatedly. The frequency control signal TCON[10:1] is set to '0100000000'=256.

As denoted by a coordinate S2, the generated frequency of the TX clock TCLK generated is lower than 48 MHz when the value of the frequency control signal TCON[10:1] is 256. In this case, the value of the frequency control signal TCON[10:1] needs to be increased. Therefore, the frequency control signal TCON[10:1] is set to '0111000000'=384.

In this way, the frequency control signals TCON[10:1] are successively set to '0111000000'=384 and '0111100000'=490 and it is determined whether the frequency of the TX clock TCLK is within the predetermined range (i.e., 47880 to 48120).

As denoted by a coordinate S5, the frequency of the TX clock TCLK is within the range of 48 MHz±0.25% when the frequency control signal TCON[10:1] is '0111100000', the frequency control signal LOCK is activated to a high level. That is, if the count value TCNT of the counter 411 is greater than the minimum value MIN and smaller than the maximum value MAX, the TX clock control circuit 410 activates the frequency lock signal LOCK to a high level, increases the value "k" by 1 (step 822), and returns to step 802.

The operating characteristics of an electronic circuit including transistors, resistors, and capacitors change minutely with changes in the ambient environments such as temperature and with changes in the operating (supply) voltage. Even though the oscillator 520 generates the TX clock TCLK with a desired frequency (i.e., 48 MHz±0.25%), a TX clock TCLK with an undesirable frequency may be generated due to a change in the ambient environments, in order to dynamically compensate for such changes in the frequency of the TX clock TCLK, the TX clock control circuit 410 changes the parameter "k" (step 822) and returns to step 802. If the width of a change in the frequency of the TX clock TCLK is small, the changed frequency is close to the previously set frequency. Therefore, the TX clock control circuit 410 can output the TX clock with the desired frequency (i.e., 48 MHz±0.25%) within a very short time by increasing the parameter "k" by 1. The parameter "k" that is reset after transition of the frequency lock signal LOCK from an active state to an inactive state may be one of the bits from the MSB "N" to the LSB "1".

In the above-described method for setting the frequency control signal TCON[10:1], steps 802 through 818 must be repeatedly performed 11 times in the worst case. Thus, the optimal frequency control signal TCON[10:1] can be set before 12 SOF packets (i.e., sync signals) are inputted. In general, when a USB device is first connected to a host, the host transfers several tens or several hundreds of SOF packets to the USB device during a control transfer period. Therefore, the clock signal generator 250 generates the TX clock TCLK compliant with USB specification before transmission of a valid data signal, thereby enabling stable data transfer.

Referring again to FIG. 4, the RX clock control circuit 450 and the RX clock generator 460 have the same structure and operation as the TX clock control circuit 410 and the TX clock generator 420. The RX clock control circuit 450 includes the counter 451 and the register 452, and outputs an RX frequency control signal RCON[10:1] in response to the enable signals RCNT_EN, TCNT_LD and ROUT_EN received from the control signal generator 430. The RX clock generator 460 generates an RX clock RCLK in response to the RX frequency control signal RCON[10:1] received from the RX clock control circuit 450.

In synchronization with the frequency (48 MHz±α %) of the RX clock generated by the RX clock generator 460, the RX clock; recovery circuit 440 generates a recovery clock RCV_CLK for recovering data received at a rate of 12 Mbps in a full-speed mode.

Because the RX clock RCLK is synchronized with the recovery clock RCV_CLK with a frequency suitable for recovery of a signal received by the RX clock recovery circuit 440 in a full-speed mode, the RX clock control circuit 450 (unlike the TX clock control circuit 410 and the TX clock generator 420) may maintain a control signal TCON[10:1] stored in the register 452, without changing the RX frequency control signal RCON[10:1] in response to the enable signals RCNT_EN, TCNT_LD and ROUT_EN.

Figure 9:
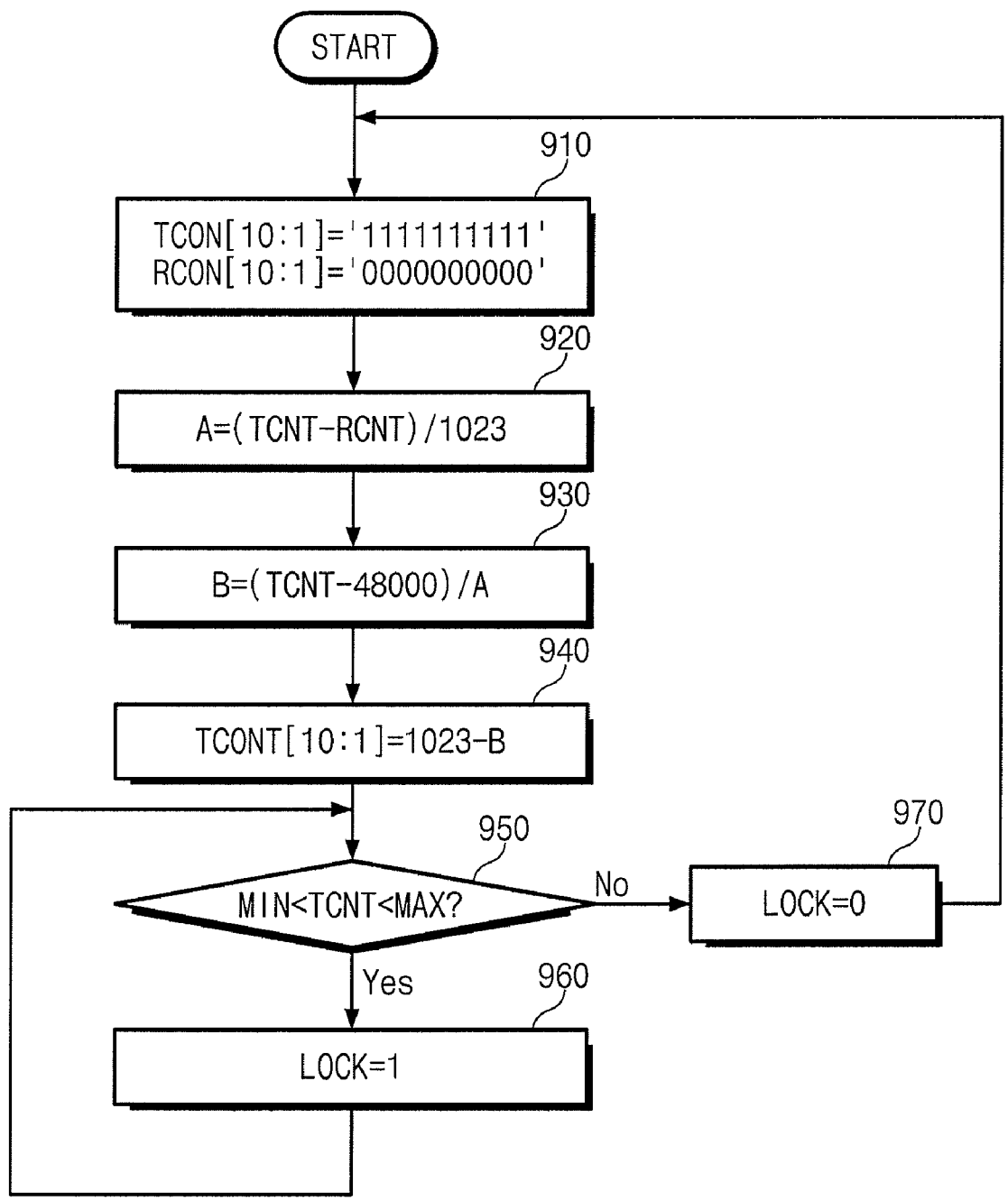
FIG. 9 is a flowchart illustrating a method for setting a TX clock control signal for adjusting the TX clock according to another embodiment of the present invention.

FIG. 9 is a flowchart illustrating a method for setting the TX clock control signal TCON[10:1] for adjusting the frequency of the TX clock TCLK according to another exemplary embodiment of the present invention.

First, the TX frequency control signal TCON[10:1] generated by the TX clock control circuit 410 is set to '1111111111'=1023 and the RX frequency control signal RCON[10:1] generated by the RX clock control circuit 450 is set to '0000000000'=0 (step 910).

The frequency of the TX clock TCLK generated by the TX frequency control signal TCON[10:1] set to '1111111111' is counted by the counter 411 of the TX clock control circuit 410, and the frequency of the RX clock TCLK generated by the RX frequency control signal RCON[10:1] set to '1111111111' is counted by the counter 451 of the RX clock control circuit 450. The count value TCNT of the counter 451 of the RX clock control circuit 450 is provided to the TX clock control circuit 410.

Based on the count value TCNT of the counter 411 and the count value RCNT of the counter 451, the TX clock control circuit 410 calculates a ratio (i.e., a gradient A) of the frequency of the TX clock TCLK to the TX clock control signal TCON[10:1] (step 920). Herein, it is assumed that the oscillator 520 of the TX clock generator 420 and an oscillator (not shown) of the TX clock generator 460 have the same characteristics as those illustrated in FIG. 7.

In the example illustrated in FIG. 7, the frequency of the RX clock RCLK is 43 MHz when the RX frequency control signal RCON[10:1] is '0000000000', and the frequency of the TX clock TCLK is 53 MHz when the TX frequency control signal TCON[10:1] is '1111111111'. In this case, because a difference between the TX frequency control signal TCON[10:1] and the RX frequency control signal RCON[10:1] is '1111111111'=1023, the gradient A is (TCNT−RCNT)/1023=(53000−43000)/1023. Herein, the period of the counter enable signal (TCNT_EN) is 1 ms.

A difference between the count value TCLK corresponding to the TX clock TCLK and the count value "48000" corresponding to the desired frequency (i.e., 48 MHz) is divided by the gradient A to calculate a compensation value B (step 930). Therefore, the TX frequency control signal TCON[10:1] for generating the TX clock TCLK with the desired frequency is immediately obtained approximately by setting the TX frequency control signal TCON[10:1] equal to 1023−B (step 940).

In order to compensate for changes in the frequency of the TX clock TCLK due to changes in the ambient environment, the TX clock control circuit 410 continuously determines whether the count value TCNT of the counter 411 is greater than the minimum value MIN and smaller than the maximum value MAX (step 950). While the count value TCNT of the counter 411 is greater than the minimum value MIN and smaller than the maximum value MAX, the frequency lock signal LOCK is set to and maintained at a high level, i.e., a logic '1' (step 960). On the other hand, if the count value TCNT of the counter 411 is smaller than the minimum value MIN or greater than the maximum value MAX, the frequency lock signal COCK is reset to a low level, i.e., a logic '0' (step 970). While the frequency lock signal LOCK is in a low-level state, the TX clock control circuit 410 repeatedly performs the above-described steps 910 to 950 in order to set the TX frequency control signal TCON[10:1].

The method illustrated in FIG. 9 of setting the frequency of the TX clock TCLK can set the TX frequency control signal TCON[10:1] using only two SOF packets (i.e., with two approximations), and thus can set the frequency of the TX clock TCLK within a shorter time. The setting of the TX frequency control signal TCON[10:1] by the TX clock control circuit 410 by the method illustrated in FIG. 9 is most practical only when the frequency of the TX clock TCLK generated by the TX clock generator 420 changes linearly according to the TX frequency control signal TCON[10:1], as illustrated in FIG. 7.

In another exemplary embodiment, the TX clock control circuit 410 can settle the TX frequency control signal TCON [10:1] without using the count value TCNT of the counter 451 in the RX clock control circuit 450 (i.e., using only a single counter). In this exemplary embodiment, the TX clock control circuit 410 obtains a first count value TCNT1 by setting the TX frequency control signal TCON[10:1] to '0000000000' for the 1 ms period of a first SOF packet, and obtains a second count value TCNT2 by setting the TX frequency control signal TCON[10:1] of '1111111111' for the 1 ms period of the next SOF packet. Thereafter, the TX clock control circuit 410 sets the optimal TX frequency control signal TCON[10:1] on the basis of a difference (or ratio) between the first and second count values TCNT1 and TCNT2 using a variation of the method Illustrated in FIG. 9. The first count value TCNT1 corresponds to and is substituted for the RX frequency control signal RCON[10:1] of FIG. 9 (e.g., setting the TX frequency control signal TCON[10.1] to '0000000000' for one 1 ms period) and the second count value TCNT2 corresponds to and is substituted for the TX frequency control signal TCON[10:1] of FIG. 9 (the TX frequency control signal TCON[10:1] to '1111111111' for one 1 ms period). If the frequency of the clock is 43 MHz when the TX frequency control signal TCON[10:1] is '0000000000', and the frequency of the clock is 53 MHz when the TX frequency control signal TCON[10:1] is '1111111111', then in this case, because a difference between the first count value TCNT1 and the second count value TCNT2 is 1023, the gradient A is (TCNT1−TCNT2)/1023= (53000−43000)/1023. Herein, the period of the counter enable signal (TCNT_EN) is 1 ms.

Hereinafter, the operation of the RX clock recovery circuit 440 shown in FIG. 4 will be described in detail.

Because the data signals D+ and D− inputted through the data terminals 203 and 204 have a rate (data frequency) of 12 MHz and the RX clock TCLK generated by the RX clock generator 460 is 48 MHz±10% each 1-bit data signal can be sampled by the RX clock RCLK 3, 4 or 5 times, thus greater than the Nyquist frequency (2 times). The RX clock recovery circuit 440 selects a portion of the pulses of the RX clock RCLK to output the recovery clock RCV_CLK so that the data signal can be sampled with its bit energy being stable.

Figure 10:
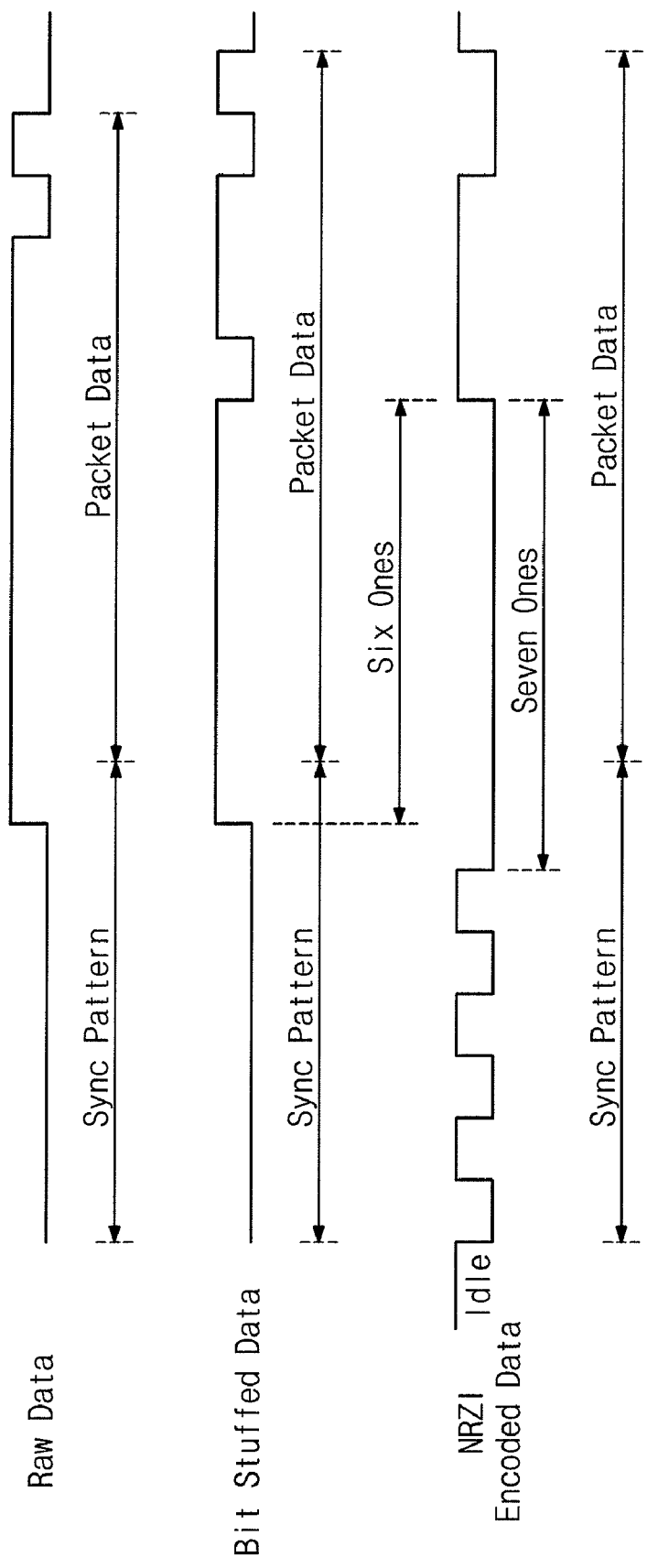
FIG. 10 is a timing diagram illustrating an exemplary process for converting data signal transferred from the host to the USB device.

FIG. 10 is a timing diagram illustrating an exemplary process for converting a data signal transferred from the host to the USB device.

Referring to FIG. 10, a raw data signal transferred from the host to the USB device includes a sync pattern and packet data. When 7 successive bits '1s' occur in the raw data signal, a stuffed bit '0' instead of '1' is inserted into the 7$^{th}$ bit. On the other hand, when 7 successive bits '0s' occur in the raw data signal, a stuffed bit '1' instead of '0' is inserted into the 7$^{th}$ bit. Because transfer of data through the D+ and D− terminals is performed in a non-return to zero inversion (NRZI) scheme, the number of successive bits '0s' or '1s' including the last data of the sync pattern may be up to 7.

The RX clock control circuit 450 shown in FIG. 4 outputs a selection signal RATE[2:0] for determining the sampling position of an RX data signal R_DATA according to the frequency of the RX clock RCLK.

FIG. 12 is a table illustrating a selection signal RATE[2:0] outputted from the RX clock control circuit 450 according to the count value RCNT of the counter 451 and a frequency division ratio corresponding to the selection signal RATE[2: 0].

While the RX data signal R_DATA is logically '1', a first counter 441 of the RX clock recovery circuit 440 counts the RX clock RCLK to output a count value NRZH_CNT. Likewise, while the RX data signal R_DATA Is logically '0', a second counter 442 of the RX clock recovery circuit 440 counts the RX clock RCLK to output a count value NRZL_CNT.

Figure 11A:
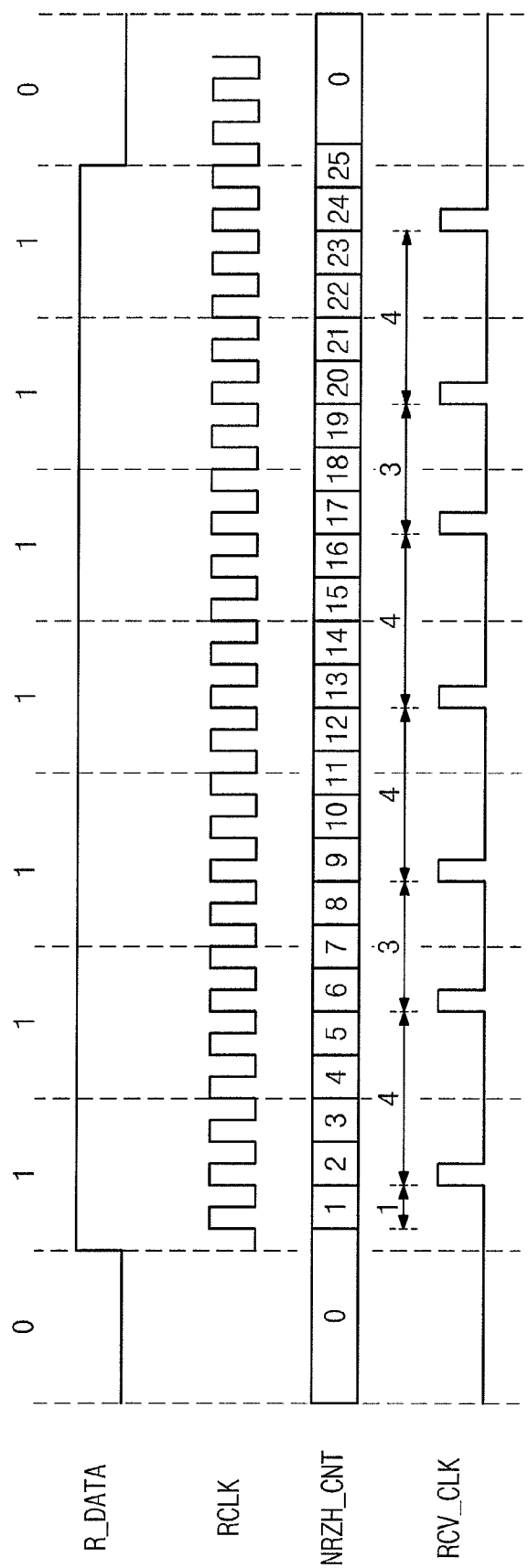
FIG. 11A is a timing diagram illustrating an example of an RX recovery clock when 7 successive bits '1s' are contained in data received from the host.
Figure 11B:
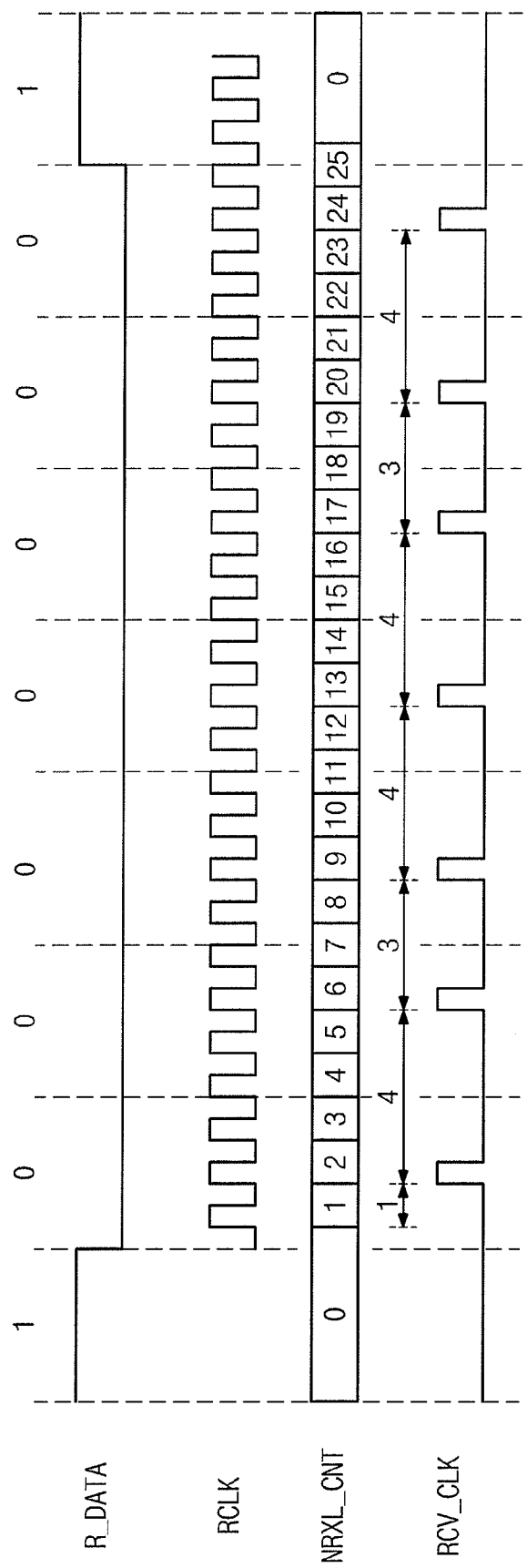
FIG. 11B is a timing diagram illustrating an example of an RX recovery clock when 7 successive bits '0s' are contained in data received from the host.

FIG. 11A is a timing diagram illustrating an example of the RX recovery clock RCV_CLK when 7 successive bits '1s' are contained in the RX data R_DATA received from the host. FIG. 11B is a timing diagram illustrating an example of the RX recovery clock RCV_CLK when 7 successive bits '0s' are contained in the RX data R_DATA received from the host.

When 7 successive bits '1s' are contained in the RX data R_DATA received from the host, the RX clock recovery circuit 440 operates as illustrated in FIG. 11A.

Referring to FIG. 11A, for example, when the count value RCNT of the counter 451 is between 42000 and 45000, the selection signal [2:0] outputted from the RX clock control circuit 450 is '010'. In response to the selection signal RATE [2:0] '010', the RX clock recovery circuit 440 generates the RX recovery clock RCV_CLK according to the count values of the first and second counters 441 and 42. When the RX data R_DATA is logically '1', the count value NRZH_CNT of the first counter 441 increases successively in synchronization with the RX clock TCLK. In response to the selection signal RATE[2:0] '010', the RX clock recovery circuit 440 outputs the RX clock RCLK as the RX recovery clock RCV_CLK whenever the count value NRZH_CNT of the first counter 441 increases by 1, 4, 3, 4, 4, 3, and 4.

When 7 successive bits '0s' are contained in the RX data R_DATA received from the host, the RX clock recovery circuit 440 operates as illustrated in FIG. 11B.

Referring to FIG. 11B, when the count value RCNT of the counter 451 is between 38000 and 40000, the selection signal [2:0] outputted from the RX clock control circuit 450 is '000'. In response to the selection signal RATE[2:0] '000', the RX clock recovery circuit 440 outputs the RX clock RCLK as the RX recovery clock RCV_CLK whenever the count value NRZH_CNT of the second counter 442 increases by 1, 4, 3, 3, 3, 3, and 4.

When the RX recovery clock RCV_CLK is generated in the methods illustrated in FIGS. 11A and 11B, the USB transceiver 240 can recover the RX data signal R_DATA under the condition that the energy of the RX data signal is in a stable state.

The frequency division ratio according to the count value RCNT illustrated in FIG. 12 is merely an example, and the range of the count value TCNT and the frequency division ratio according to the count value RCNT may vary with the operational conditions of the clock signal generator 250.

As described above, the clock signal generator according to the present invention can generate a clock signal that is suitable for the data transfer rate defined in the USB specification. In addition, the clock signal generator can generate an RX clock signal so that an RX data signal with its energy being stable can be recovered.

In this specification, a smart card is illustrated as an example of a USB device including a clock signal generator, and a computer system is illustrated as an example of a host communicating with the smart card However, the present invention is not limited to these examples. In addition, the USB device including the clock signal generator can be connected with a variety of hosts having a USB port to perform communication compliant with the USB protocol.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest patentable interpretation of the following claims and their equivalents, and shall not be restricted or limited by the foregoing detailed description.

What is claimed is:

1. A clock signal generator comprising:
a control circuit configured to count the cycles of a clock signal during each period between two sync signals successively inputted, and to generate a frequency control signal based upon each count value; and
a clock generator configured to generate the clock signal having a frequency corresponding to the frequency control signal:
wherein the frequency control signal comprises a plurality of bits;
wherein the clock generator comprises:
a current controller configured to generate a current corresponding to the frequency control signal; and
an oscillator generating the clock signal having a frequency corresponding to the current;
wherein the current controller comprises:
a plurality of resistors each corresponding to the respective bits of the frequency control signal, each of the resistors having a first terminal commonly connected to a power voltage; and
a plurality of switches each connected to a corresponding one of the resistors and controlled respectively by the corresponding bits of the frequency control signal, each of the switches having a first terminal connected to a second terminal of the corresponding resistor and a second terminal connected to a first node.
wherein the amount of current flowing through each of the respective resistors to the first node are different from each other.

2. The clock signal generator of claim 1, wherein the control circuit locks the frequency control signal when the count value is within a predetermined range.

3. The clock signal generator of claim 1, wherein the oscillator generates the clock signal having a frequency corresponding to the amount of the current flowing to the first node.

4. The clock signal generator of claim 3, wherein the control circuit comprises:
a control signal generator configured to generate a first enable pulse signal in synchronization with the two sync signals successively inputted and to generate a second enable pulse signal in synchronization with the first enable pulse signal; and
a TX clock controller configured to start to count in response to the first enable pulse signal and to generate the frequency control signal corresponding to the count value in response to the second enable pulse signal.

5. The clock signal generator of claim 4, wherein the TX clock controller activates a frequency lock signal when the count value is within a predetermined range.

6. The clock signal generator of claim 5, wherein the control signal generator stops the generation of the second enable pulse signal when the frequency lock signal is activated.

7. The clock signal generator of claim 6, wherein the frequency control signal is an N-bit signal (wherein N is a positive integer), and the TX clock controller successively changes the bits of the frequency control signal when the count value is not within the predetermined range.

8. The clock signal generator of claim 7, wherein the TX clock controller locks the frequency control signal when the count value is within the predetermined range.

9. The clock signal generator of claim 8, wherein the TX clock controller receives an error range signal for defining the predetermined range.

10. The clock signal generator of claim 4, wherein the two sync signals are start-of-frame (SOF) signals according to the USB specification.

11. The clock signal generator of claim 10, wherein the control signal generator controls the oscillator to be disabled during a suspend mode defined in the USB specification.

12. A clock signal generator comprising:
a control signal generator configured to generate first and second TX enable pulses and a first RX enable pulse in synchronization with two sync signals successively inputted;
a TX clock controller configured to start to count a TX clock signal in response to the first TX enable pulse and to generate a TX frequency control signal corresponding to the first count value in response to the second TX enable pulse;
a TX clock generator configured to generate the TX clock signal with a frequency corresponding to the TX frequency control signal;
an RX clock controller configured to generate an RX frequency control signal in response to the first RX enable pulse; and
an RX clock generator configured to generate a first RX clock signal with a frequency corresponding to the RX frequency control signal.

13. The clock signal generator of claim 12, further comprising an RX clock recoverer configured to start counting the first RX clock signal in synchronization with transition of an input data signal and to generate a second RX clock signal when the count value reaches predetermined values.

14. The clock signal generator of claim 13, wherein the control signal generator generates the first TX enable pulse in synchronization with the two sync signals successively inputted, generates the second TX enable pulse in synchronization with the first TX enable pulse, generates a second RX enable pulse in synchronization with the two sync signals successively inputted, and generates the first RX enable pulse in synchronization with the second RX enable pulse.

15. The clock signal generator of claim 14, wherein the RX clock controller starts counting the first RX clock signal in response to the second RX enable pulse and provides the RX clock recoverer with the predetermined values corresponding to the second count value.

16. The clock signal generator of claim 14, wherein the RX clock controller starts to count the first RX clock signal in response to the second RX enable pulse and generates the RX frequency control signal corresponding to the second count value in response to the first RX enable pulse.

17. The clock signal generator of claim 16, wherein the RX clock controller locks the RX frequency control signal when the second count value is within a predetermined range.

18. The clock signal generator of claim 16, wherein the RX frequency control signal comprises a plurality of bits.

19. The clock signal generator of claim 18, wherein the current controller comprises:
a voltage generator configured to generate a control voltage;
a plurality of switches corresponding respectively to the bits of the RX frequency control signal and controlled respectively by the corresponding bits of the RX frequency control signal, each of the switches having a first terminal connected to a first node; and a plurality of transistors controlled by the control voltage, each of the transistors having a first terminal connected to a power voltage and a second terminal connected to a second terminal of the corresponding switch, wherein the amount of current flowing through each of the respective transistors to the first node are different.

20. The clock signal generator of claim 18, wherein the current controller comprises:

a plurality of switches corresponding respectively to the bits of the RX frequency control signal and controlled respectively by the corresponding bits of the RX frequency control signal, each of the switches having a first terminal connected to a first node; and a plurality of resistors, each of the resistors having a first terminal connected to a power voltage and a second terminal connected to a second terminal of the corresponding switch, wherein the amount of resistance through each of the respective resistors is different from each other.

21. The clock signal generator of claim 19, wherein the oscillator generates the RX clock signal having a frequency corresponding to the amount of the current flowing to the first node.

22. The clock signal generator of claim 12, wherein the RX clock generator comprises:

a current controller configured to generate a control current corresponding to the RX frequency control signal; and an oscillator configured to generate the RX clock signal with a frequency corresponding to the control current.

23. The clock signal generator of claim 12, wherein the TX clock controller locks the TX frequency control signal when the first count value is within a predetermined range.

24. The clock signal generator of claim 12, further comprising a clock recoverer configured to receive the RX clock signal and to generate an RX recovery clock with a frequency suitable for data reception according to the USB specification.

25. The clock signal generator of claim 24, wherein the RX clock signal has a frequency higher than the frequency of the RX recovery clock.

26. The clock signal generator of claim 25, wherein the clock recoverer frequency divides the RX clock signal and outputs the frequency divided RX clock signal as the RX recovery clock according to a frequency division ratio corresponding to the second count value.

27. A clock signal generation method comprising:

generating a clock signal;

receiving two sync signals successively and counting the number of cycles of the clock signal generated during the period between the two sync signals; and changing the frequency of the clock signal according to the count value if the count value is not within a predetermined range;

wherein the changing of the frequency of the clock signal comprises:

generating, a frequency control signal corresponding to the count value; and changing the frequency of the clock signal according to the frequency control signal;

wherein the frequency control signal comprises N bits (wherein N is a positive integer), and the generating of the frequency control signal comprises:

selecting one among the N bits;

setting the selected bit to a first value;

determining whether the count value is within a predetermined range; and resetting the selected bit to a second value if the count value is not within a predetermined range.

28. The clock signal generation method of claim 27, wherein generating the clock signal comprises locking the frequency of the clock signal while the count value is within a predetermined range.

29. The clock signal generation method of claim 27, wherein the frequency control signal comprises a plurality of bits, and the generating of the frequency control signal comprises:

determining whether the count value is within a predetermined range; and changing the values of the bits of the frequency control signal when the count value is not within a predetermined range.

30. The clock signal generation method of claim 29, wherein the generating of the frequency control signal further comprises locking the values of the bits of the frequency control signal when the count value is within the predetermined range.

31. The clock signal generation method of claim 27, wherein the generating of the frequency control signal further comprises:

selecting one among the unselected bits of the N bits when the count value is not within the predetermined range; and returning to the determining step.

32. The clock signal generation method of claim 27, wherein the generating of the frequency control signal further comprises:

setting the previously-selected bit of the N bits to a currently-selected bit when the count value is within the predetermined range; and activating a frequency lock signal when the count value is within the predetermined range.

33. The clock signal generation method of claim 32, wherein the frequency lock signal is initially in an inactive state, and the generating of the frequency control signal is performed while the frequency lock signal is in an inactive state.

34. A clock signal generation method comprising:

a) generating a first clock with a maximum frequency;

b) generating a second clock with a minimum frequency;

c) receiving a first sync signal and a second sync signal and counting the first clock during the period between the first and second sync signals; and d) changing the frequency of the first clock according to the count value of the first clock and a count value of the second clock.

35. The clock signal generation method of claim 34, further comprising counting both the first clock and the second clock during the period between the first and second sync signals.

36. The clock signal generation method of claim 34, further comprising, receiving a third sync signal and counting the second clock during the period between the second and third sync signals.

37. The clock signal generation method of claim 34, wherein the changing of the frequency of the first clock comprises changing the frequency of the first clock according to the difference between the count value of the first clock and the count value of the second clock.

38. The clock signal generation method of claim 34, further comprising counting the first clock with the changed frequency, wherein the steps a) through d) are repeatedly performed when the count value of the first clock is not within a predetermined range.

39. An circuit comprising:
- a transceiver configured to transferring/receiving data through a data terminal in synchronization with a TX/RX clock according to the USB specification, and to detect a sync signal received through the data terminal, and to output the detection signal upon detecting a sync signal; and
- a clock signal generator configured to count the number of cycles of the TX clock during the period between two successive cycles of the detection signal outputted from the transceiver, and to generate the TX clock with a frequency corresponding to the count value;

wherein the clock signal generator comprises:
- a TX clock control circuit configured to count the TX clock during the period between the two detection signals, and to generate a TX frequency control signal corresponding to the count value; and
- a TX clock generator configured to generate the TX clock with a frequency corresponding to the TX frequency control signal.

40. The circuit of claim 39, wherein the TX clock control circuit locks the TX frequency control signal when the count value is within a predetermined range.

41. The circuit of claim 39, wherein the clock signal generator comprises:
- an RX clock control circuit configured to count the RX clock during the period between the two detection signals, and to generate an RX frequency control signal corresponding to the count value; and
- an RX clock generator configured to generate the RX clock with a frequency corresponding to the RX frequency control signal.

\* \* \* \* \*